R. R. MILLER.
APPLIANCE FOR MEASURING AND COMPUTING HEIGHTS AND DISTANCES.
APPLICATION FILED JULY 17, 1913.
1,153,098.
Patented Sept. 7, 1915.
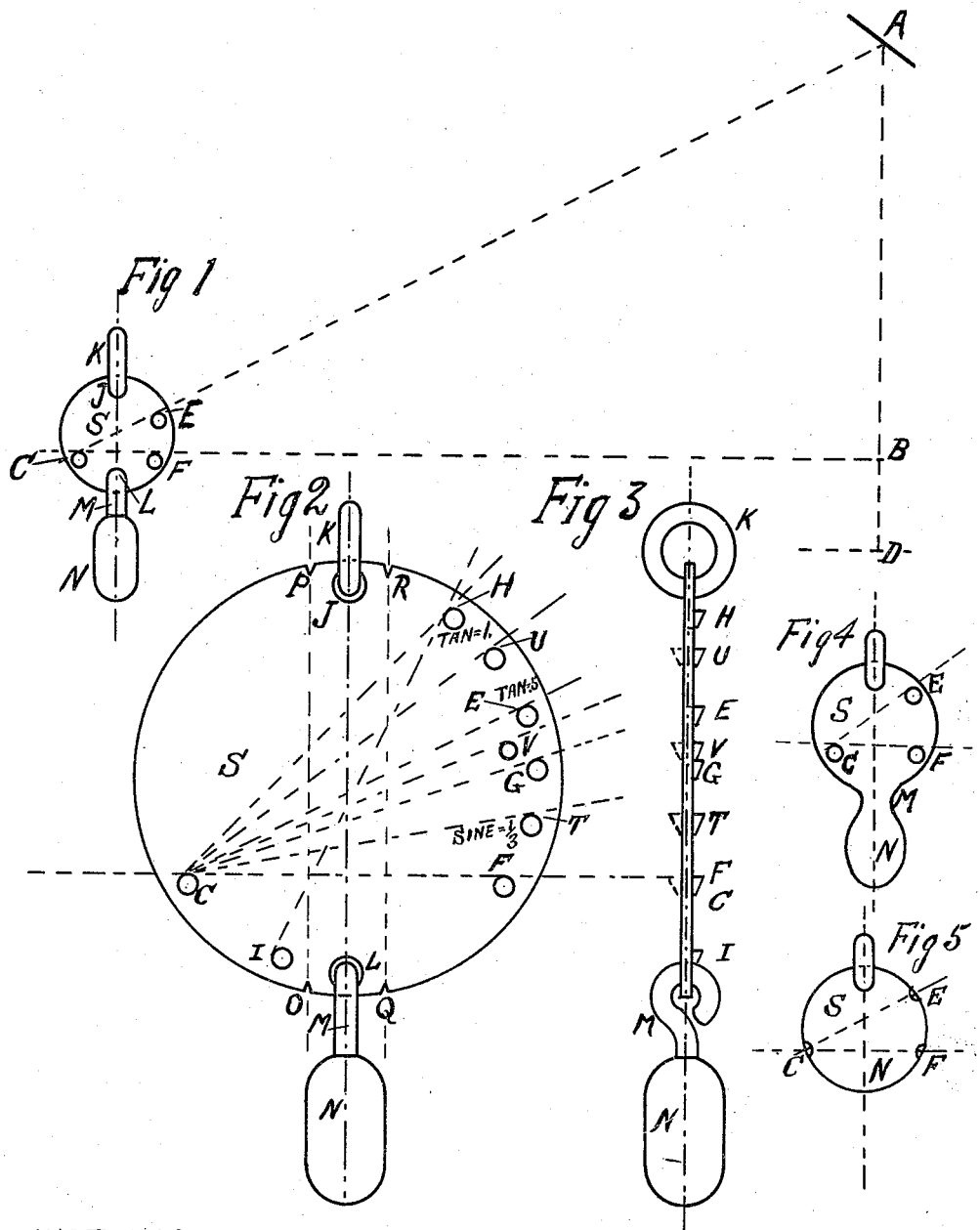
WITNESSES
INVENTOR

UNITED STATES PATENT OFFICE.

ROBERT R. MILLER, OF TOLEDO, OHIO.

APPLIANCE FOR MEASURING AND COMPUTING HEIGHTS AND DISTANCES.

1,153,098. Specification of Letters Patent. Patented Sept. 7, 1915.

Application filed July 17, 1913. Serial No. 779,550.

*To all whom it may concern:*

Be it known that I, ROBERT R. MILLER, a citizen of the United States of America, residing at Toledo, in the county of Lucas and State of Ohio, have invented certain new and useful Improvements in Appliances for Measuring and Computing Heights and Distances, of which the following is a specification, reference being had to the accompanying drawings.

My invention relates to appliances for determining vertical and horizontal planes and measuring and computing distances not readily accessible.

It is the object of the invention to obtain a construction that shall be rugged, portable, not easily put out of adjustment, but easily understood and giving results sufficiently accurate for the use of woodsmen—sportsmen—wiremen—prospectors and others who wish an approximate measure of the heights of trees, wires, projections, hills and the horizontal distance to a point directly below some point on the hillside and similar measurements which cannot readily be made by direct measurement with a tape line or other ordinary method unless regular surveying instruments are resorted to.

The invention consists in a peculiar construction consisting of a number of notches, pins or projections so situated that two of these are in a horizontal line when the appliance is in use, and one or more of them located or adapted to be so located and the plate hanging normally free, that the distance of each of these above a horizontal line through the nearer or observation point shall bear a definite relationship to the horizontal distance between the observation point and a point vertically below the particularly selected distant point. These points are preferably selected so that the horizontal distance shall be ½—1—2—3 or 4 times the vertical distance. Other points are so situated that the vertical distances from these points to the base or horizontal line or plane bear a definite relation to the shortest distances of the points from the observation point, while another point or points are so situated that the horizontal distance from the foot of a perpendicular dropped from the point to the horizontal line or plane shall bear a definite and simple relationship to the shortest distance from the point to the observation point.

The invention further consists of one or two pairs of sighting notches, pins or projections placed in a perpendicular line on a plate which is pivoted to swing freely and which is provided with a weight so arranged that when the plate is suspended the weight will cause the points to be brought into perpendicular alinement.

The invention further consists in the provision of other points which are brought into horizontal alinement at the time that the first mentioned points are brought into vertical alinement.

In the drawings, Figure 1 shows a front view of one form of the appliance and also the method of using it. Fig. 2 shows a front view, and Fig. 3 an edge view of another form of the appliance. Figs. 4 and 5 show front views of modified constructions in which the plate S, link M and weight N are combined in one piece of metal. While possibly not giving as accurate results, this construction is better adapted to toy, souvenir and advertising uses.

K is a supporting handle, ring or link which supports the main plate S at a point J but allows the plate to swing freely in a vertical plane.

N is a weight attached by the connection M to the plate S at a point L vertically below the point J but so that N may hang freely and loosely thus maintaining the plate S in a vertical position.

P O R Q are vertical sighting notches (or pins or projections may be used in place of notches) C, I, H, U, E, V, G, T and F are sight points which may be pins inserted in the plate as in Fig. 2, projections from the plate itself as in Fig. 3, or notches in projected portions of the plate as in Fig. 5 where a portion of the plate is shown to project and notches in said projection. In this position points C and F are in a horizontal line. The pairs of points PO and RQ each lie in the vertical plane as viewed from the flat side of the appliance. The points H. E. G and I are so located that the lines CH—CE—CG and IH passing through these points are hypotenuses of right angled triangles whose base is in the horizontal line CF (or a horizontal line passing through I in the case of IH). The angles made by the hypotenuse with the base are such that the tangents of the angles shall be as simple as possible, such as 2—1—.5—.3333 or .25 for ease in multiplication.

The points T and U are so located that the sines of the angles UCF and TCF are simple fractions, as one-third or one-fourth, and V is so located that the cosine of the angle VCF is a comparatively simple fraction as .8 or .75. More points may be used, and the observation point may differ in the various measurements but the principle in all is that in any observation we have a right angled triangle with a horizontal base, the angle of which the hypotenuse through any selected point is fixed and one side of the triangle being accessible to measurement by a line or rod the other desired side may be found by a simple multiplication. These multipliers may be stamped on the base adjacent to the corresponding points as shown near H and T, or indicated in other suitable manner.

In using the appliance we wish for example to find the height of an aerial cable at A. The observer finds a position such that when the appliance is allowed to hang freely and vertically, A shall be, (we will assume) in line CE extended and since by construction of the appliance C and F are in the horizontal plane, the point B vertically below A being in line with these two points must also be in the same horizontal plane in which case the tangent of the angle ACB is the same as that of the coinciding angle ECF or .5 and the height AB above the horizontal plane is one-half of the distance C to B which can be measured with a rod or tape as also the distance from B to the earth at D thus giving us (by adding AB and BD the total height AD.)

The location of B and D vertically below A can be determined by use of the vertical sighting points PO and RQ, one observation being taken in the plane containing the points ABC and the other at a considerable angle to this plane. In computing the height of A on a hillside or the distance on the horizontal line to a point B vertically below the point A, we measure by suitable direct means the distance AC and multiply by the sine or cosine of the angle at C. For convenience of use in restricted locations when it is difficult to find a base line of a fixed proportion to the height of the object to be measured, there are provided the several sighting points so that observations of an altitude are possible from several distances.

In measuring the height vertical elevation of a selected point on a hillside where the distance or hypotenuse of the triangle which in this case is the slant height or surface distance up the hillside can be measured with a line the sighting points T and U are used in connection with the observation point C to determine the height of the selected point above the base line, and for finding the horizontal distance back within the hill to a point vertically below a given point the sighting point V is used in connection with the observation point C. The horizontal distance in this instance would be (assuming the point to be A on the hillside) AO multiplied by the cosine of the angle VOS, the line VO coinciding with the line AO. To avoid confusion some of the sighting points may be located on the opposite side of the plate S as indicated by the dotted projections on the drawing. In this appliance the angles are fixed, the sines, tangents and cosines are simple and indicated, requiring no note book or pencil to solve, all triangles are right angled with horizontal base, hence when the proper geographical location of C is found the measurement of the accessible side multiplied by the factor indicating sine, tangent or cosine as the case may be, gives the length of the desired side.

I claim:

1. In a surveying instrument, a plate or disk, means for pivotally suspending said plate or disk at a point above its center of gravity, an observation member carried by the plate or disk on one side of the vertical line through the pivotal suspension point and the center of gravity, a plurality of observation members on the opposite side of said vertical line, one of said last named observation members being in horizontal alinement with the first mentioned observation member when the plate is at rest, and the other observation members being in the same vertical plane with the horizontally alined observation members, and being located at different vertical distances above said horizontally alined members.

2. In a surveying instrument, a plate or disk, means for pivotally suspending the plate or disk at a point above its center of gravity, an observation point carried by said plate on one side of the vertical line through the center of gravity and the point of suspension, a second observation point on the opposite side of the vertical line, said second observation point or member being in horizontal alinement with said first named observation point or member, and a plurality of observation points or members disposed above said second named observation point or member at various angular distances from a base line between the first mentioned and the second mentioned observation points or members, where the first mentioned observation point is taken as the vertex of the angle.

3. In a surveying instrument, a plate or disk, means for pivotally suspending the plate or disk at a point above its center of gravity, an observation member or point carried by said plate on one side of the vertical line through the center of gravity and the point of suspension, a second observation point on the opposite side of the vertical line, said second observation point or member being in horizontal alinement with said first named observation point or member, and a plurality of observation points or members disposed above said second named observation point or member at various angular distances from a base line between the first mentioned and the second mentioned observation points or members, where the first mentioned observation point is taken as the vertex of the angle, and a weight suspended from the bottom of said disk or plate.

4. In a surveying instrument, a plate or disk, a handle for said plate pivotally secured to the plate above the center of gravity, a weight pivotally secured to the plate below the center of gravity, a main observation point on one side of the vertical line between the center of gravity and the point of support, and a plurality of observation points on the opposite side of the vertical line, said last mentioned points being disposed at predetermined vertical distances above said first mentioned points.

In testimony whereof I affix my signature in presence of two witnesses.

ROBERT R. MILLER.

Witnesses:
ARTHUR J. KEEFER,
LOUIS WHEATING.

Copies of this patent may be obtained for five cents each, by addressing the "Commissioner of Patents, Washington, D. C."